United States Patent
Minakata et al.

(10) Patent No.: US 6,556,727 B2
(45) Date of Patent: Apr. 29, 2003

(54) TRAVELLING WAVE-TYPE OPTICAL MODULATOR

(75) Inventors: Makoto Minakata, Nagoya (JP); Jungo Kondo, Nagoya (JP); Atsuo Kondo, Nagoya (JP); Kenji Aoki, Nagoya (JP); Osamu Mitomi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/954,368

(22) Filed: Sep. 17, 2001

(65) Prior Publication Data

US 2002/0126932 A1 Sep. 12, 2002

Related U.S. Application Data

(60) Provisional application No. 60/274,492, filed on Mar. 9, 2001.

(30) Foreign Application Priority Data

Sep. 22, 2000 (JP) ........................................ 2000-289002
Mar. 2, 2001 (JP) ........................................ 2001-058083

(51) Int. Cl.⁷ ............................................. G02F 1/035
(52) U.S. Cl. ............................................. 385/2
(58) Field of Search ................................. 385/1–10, 14

(56) References Cited

U.S. PATENT DOCUMENTS

| | | | | | |
|---|---|---|---|---|---|
| 4,251,130 A | * | 2/1981 | Marcatili | ........................ | 385/9 |
| 4,776,656 A | * | 10/1988 | Sanford et al. | ................ | 385/2 |
| 5,153,934 A | * | 10/1992 | Okayama et al. | .............. | 385/40 |
| 5,313,535 A | * | 5/1994 | Williams | ....................... | 385/14 |
| 5,790,719 A | * | 8/1998 | Mitomi et al. | .................. | 385/2 |
| 5,841,568 A | * | 11/1998 | Miyakawa | ................... | 359/245 |
| 5,886,807 A | | 3/1999 | Cummings | | |
| 5,982,958 A | * | 11/1999 | Minowa et al. | ................. | 385/2 |
| 6,069,729 A | * | 5/2000 | Gill et al. | .................... | 359/245 |
| 6,172,791 B1 | * | 1/2001 | Gill et al. | .................... | 359/249 |
| 6,226,423 B1 | * | 5/2001 | Minakata et al. | .............. | 385/2 |
| 6,400,494 B1 | * | 6/2002 | Kondo et al. | ................ | 359/322 |
| 2001/0007601 A1 | * | 7/2001 | Kondo et al. | .................. | 385/2 |

FOREIGN PATENT DOCUMENTS

| | | | | |
|---|---|---|---|---|
| EP | 0828175 | 3/1988 | | |
| EP | 0985948 | 3/2000 | | |
| EP | 1109050 A1 | * | 6/2001 | ........... G02F/1/035 |
| EP | 1193536 A2 | * | 4/2002 | ........... G02F/1/035 |
| JP | 01232323 | 9/1989 | | |
| JP | 08304862 A | * | 11/1996 | ............. G02F/1/37 |
| JP | 2001174765 A | * | 6/2001 | ........... G02F/1/035 |

* cited by examiner

Primary Examiner—Akm E. Ullah
Assistant Examiner—Michelle R. Connelly-Cushwa
(74) Attorney, Agent, or Firm—Burr & Brown

(57) ABSTRACT

A travelling wave-type optical modulator has a substrate made of an electro-optic material, optical waveguides fabricated on the top surface of the substrate, and electrodes for modulating an optical wave through the optical waveguide. The substrate is partially thinned from the bottom surface of the substrate to form a first thinned portion and a second thinned portion so that the thickness of the first thinned portion is set to be larger than the thickness of the second thinned portion, and the optical waveguide is positioned in the first thinned portion.

6 Claims, 6 Drawing Sheets

TRAVELLING WAVE-TYPE OPTICAL MODULATOR

CROSS REFERENCE TO RELATED APPLICATION

This application claims the benefit of U.S. Provisional Application No. 60/274,492, filed Mar. 9, 2001, the entirety of which is incorporated herein by reference.

BACKGROUND OF THE INVENTION

1. Field of the Invention

This invention relates to a travelling wave-type optical modulator.

2. Related Art Statement

The inventors disclosed in Japanese Laid-open publication Kokai Hei 10-133159(JP A 10-133159) that the portion of a substrate, constituting a travelling wave-type optical modulator, below an optical waveguide is thinned up to e.g. 10 µm or below, for the high speed operation of the optical modulator and the reduction of the product (Vπ·L) of operating voltage Vπ by electrode length L in the optical modulator.

The inventors have intensely investigated the above-type optical modulators and found out that the travelling wave-type optical modulators tend to be degraded through the increase of the optical insertion loss.

SUMMARY OF THE INVENTION

It is an object of the present invention to, in a travelling wave-type optical modulator including such a partionally thinned substrate made of a electro-optic single crystal, decrease the product (Vπ·L) of operating voltage Vπ by electrode length L and the optical insertion loss with keeping the velocity matching for a microwave signal and the travelling optical wave.

This invention relates to a travelling wave-type optical modulator comprising;

a substrate made of an electro-optic material,
  an optical waveguide fabricated on the top surface of the substrate, and
  electrodes for modulating an optical wave through the optical waveguide,
wherein the substrate is partially thinned from the bottom surface of the substrate to form a first thinned portion and a second thinned portion so that the thickness of the first thinned portion is set to be larger than the thickness of the second thinned portion, and the optical waveguide is positioned in the first thinned portion.

The phrase "the optical waveguide is provided in the first thinned portion" means that at least the optical refractive index center of the optical waveguide exists within the first thinned portion.

The inventors have intensely studied the cause of the increase of the optical insertion loss when the substrate is partially thinned below the optical waveguide for the velocity matching of a microwave signal and a travelling optical wave, and found out the following facts. As mentioned above, for realizing the velocity matching of a microwave signal of 10 GHz or over and a travelling optical wave, the substrate is required to be partially thinned up to 10 µm below the optical waveguide. The thus obtained thinned portion of the substrate is surrounded by environmental atmosphere having a much lower refractive index than that of the electro-optic single crystal constituting the substrate.

As a result, the optical waveguide provided in the thinned portion is likely to be plain-formed. On the other hand, the mode field pattern of an optical fiber connected to the travelling wave-type optical modulator before its introduction to the optical modulator is perfect circle. Therefore, it may be that the discrepancy in the mode field pattern of the travelling optical wave in between the optical modulator and the optical fiber is increased, so the optical energy of the travelling optical wave is not efficiently traveled and thus, the optical insertion loss is increased.

If the thinned portion of the substrate is upsized for mitigating the inefficient optical energy travel, the velocity matching of the microwave signal and the travelling optical wave can not be almost realized and the product (Vπ·L) of the operating voltage Vπ by the electrode length L is increased.

From this point of view, the inventors have conceived that two types of thinned portion, a first thinned portion and a second thinned portion, are formed adjacently in the substrate constituting the optical modulator so that the first thinned portion is larger than the second thinned portion in their thickness, and the optical waveguide is fabricated in the first thinned portion. In this case, the optical insertion loss of the optical modulator can be reduced with keeping the velocity matching of the microwave signal and the travelling optical wave and keeping the product (Vπ·L) low.

Next, this invention will be described in detail as follows, with reference to the attaching figures.

BRIEF DESCRIPTION OF THE DRAWINGS

For a better understanding of this invention, reference is made to the attached drawings, wherein.

DETAILED DESCRIPTION OF THE PREFERRED EMBODIMENTS

Figure 1:
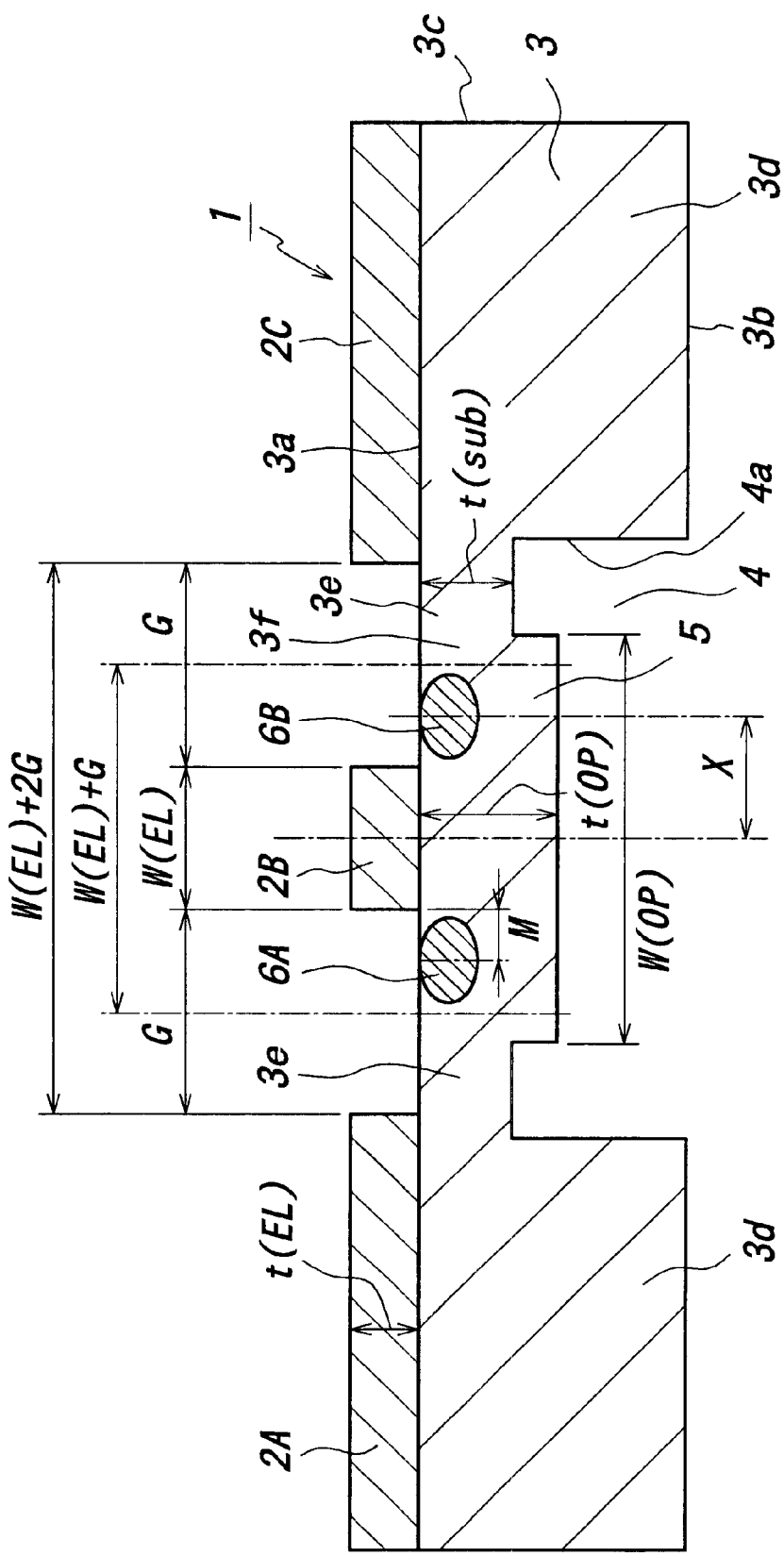
FIG. 1 is a cross sectional view schematically showing a travelling wave-type optical modulator 1 according to the present invention.

FIG. 1 is a cross sectional view schematically showing a travelling wave-type optical modulator 1 according to the present invention. In the optical modulator 1 shown in FIG. 1, a first thinned portion 3f and two second thinned portions 3e are formed in the substrate 3 made of an electro-optic material, preferably an electro-optic single crystal. Also, the substrate 3 has two thickened portions 3d and a recessed portion 4 through the formation of the first thinned portion 3f and the second thinned portions 3e. The first thinned portion 3f is larger in its thickness than the second thinned portions 3e by the protrusion 5 in the recessed portion 4. A pair of optical waveguides 6A and 6B are formed in the top surface 3a side of the first thinned portion 3f.

Then, triserial electrodes 2A, 2B and 2C are provided on the top surface 3a of the substrate 3. Each electrode is connected to a microwave signal generator not shown. In this embodiment, the substrate 3 is made of a X-cut or Y-cut electro-optic single crystal, and a TE-mode optical wave is traveled in the optical waveguides 6A and 6B. Therefore, the optical waveguides 6A and 6B are set in between the adjacent electrodes 2A and 2B and the adjacent electrodes 2B and 2C, respectively.

In the travelling wave-type optical modulator, the electric field of the microwave signal (modulating signal) travelling in the electrode 2B leaks to the backside of the substrate 3 (the recessed portion 4) to much degree. That is, the electric field of the microwave signal leaks to the environmental atmosphere in the recessed portion 4, including the space below the second thinned portion 3e. As a result, the phase velocity of the microwave signal can be enhanced.

Moreover, since the first thinned portion 3f is set to be larger in its thickness than the second thinned portion 3e by the protrusion 5, the distortion of the mode field pattern of the optical waveguides 6A and 6B, fabricated in the first thinned portion 3f, can be repressed, compared with the first thinned portion 3f having the same thickness as that of the second thinned portion 3e, that is, the substrate having a single recessed portion, so that the optical insertion loss for the optical modulator can be reduced.

Although, in FIG. 1, the protrusion 5 is provided in the recessed portion 4, it may be formed on the top surface 3a of the substrate 3. Moreover, plural protrusion may be formed in the recessed portion 4 and on the top surface 3a, respectively. Also, in this case, the first thinned portion 3f is set to be larger in its thickness than the second thinned portion 3e by the protrusions. However, the formation of the protrusion 5 in the recessed portion 4 enables the voltage-applying efficiency to be enhanced and the product (Vπ·L) of the operating voltage Vπ by the electrode length L to be decreased.

The first thinned portion 3f and the second thinned portion 3e (the recessed portion 4) can be fabricated by laser ablation processing using excimer laser or dicing processing.

As mentioned above, the substrate 3 is made of an electro-optic material, particularly a ferroelectric single crystal. Any kind of ferroelectric single crystal can be employed only if it can exhibit the electro-optic effect for electro-optic modulation. Lithium niobate single crystal, lithium tantalate single crystal, lithium niobate-lithium tantalate solid solution single crystal, lithium potassium niobate, KTP, GaAs and quartz may be exemplified. Particularly, at least one selected from among the lithium niobate single crystal, lithium tantalate single crystal and the lithium niobate-lithium tantalate solid solution single crystal may be used.

In FIG. 1, the substrate 3 is preferably made of a X-cut or Y-cut single crystal of lithium niobate, lithium tantalate or lithium niobate-lithium tantalate solid solution.

In the light of remarkable reduction of the effective refractive index (nm) of the microwave signal, the thickness t(OP) of the first thinned portion 3f is preferably set to be 100 μm or below, particularly 20 μm or below. On the other hand, the thickness t(OP) is set to be 1 μm or over for maintaining the mechanical strength of the substrate 3 to some degree.

According to the present invention, the thickness t(sub) of the second thinned portion 3e is required to be less than the thickness t(OP) of the thickness of the first thinned portion 3f. In the light of remarkable reduction of the effective refractive index (nm) of the microwave signal, the thickness t(sub) is preferably set to be 12.5 μm or below, particularly 10 μm or below.

In addition, it is better as the difference between the thickness t(OP) and the thickness t(sub) is set to be larger. Concretely, it is desired that the difference is set to be 1 μm or over, but 25 μm or below.

It is desired that the thickness t(EL) of each electrode is set to be 15–50 μm. The effective refractive index, the characteristic impedance and the electrode loss depend on the thickness t(EL). If the thickness t(EL) is decreased, the thickness t(sub) is required to be decreased to reduce the effective refractive index of the microwave signal, resulting in the increase of the electrode loss. On the other hand, if the thickness t(EL) is increased, both of the effective refractive index of the microwave signal and the electrode loss can be reduced, but some problems occur in fabricating the electrodes. Therefore, the thickness t(EL) is set within 15–50 μm in view of the effective refractive index, the characteristic impedance and the electrode loss.

The width W(EL) of the central electrode 2B is preferably set within 5–50 μm because too small width W(EL) may increase the electrode loss.

The gap G between the adjacent electrodes is set within 25–55 μm because too large gap G may increase the driving voltage.

For fabricating the optical waveguides 6A and 6B in the first thinned portion 3f, the first thinned portion 3f is required to have its width equal to or larger than the total width of the optical waveguides 6A and 6B, which are provided in between the gaps G, respectively. In the light of much reduction of the refractive index of the microwave signal and the product (Vπ·L) of the operating voltage Vπ by the electrode length L, the width W(OP) of the first thinned portion 3f is preferably set to be [W(EL)+2G] or below, particularly [W(EL)+G] or below.

Moreover, if the width W(OP) of the first thinned portion 3f is set to be too small, the mode field pattern of the optical waveguides is distorted, because the optical waveguides are too close to the second thinned portion 3e. Therefore, the width W(OP) is set to be [W(EL)+2 μm] or over.

If the thickness t(sub) is set to be equal to the thickness t(OP), that is, only a single thinned portion is formed in the substrate 3, which is different from this invention, the above-mentioned effects of the decrease of the product (Vπ·L) and the optical insertion loss can not be realized even though the optical wave-guides 6A and 6B are fabricated near the electrode 2B or adjacently each other.

Each electrode can be made of any material having a low resistance and a good impedance performance, for example, Au, Ag, Cu.

Moreover, a buffer layer may be provided between the top surface 3a of the substrate 3 and the electrodes 2A–2C. The buffer layer may be made of a well known material such as silicon oxide, magnesium fluorine, silicon nitride or alumina.

In the above embodiment, the substrate 3 is made of a X-cut or Y-cut ferroelectric single crystal, but may be made of a Z-cut ferroelectric single crystal. In the case of using the Z-cut ferroelectric single crystal as the substrate 3, the optical waveguides 6A and 6B are required to be provided under the electrodes 2A and 2B or the electrodes 2C and 2B, and for reducing the optical travelling loss, a buffer layer is preferably provided between the top surface 3a of the substrate 3 and the electrodes 2A–2C. In this case, the buffer layer may be made of silicon oxide, magnesium fluorine, silicon nitride or alumina, as mentioned above.

Figure 2:
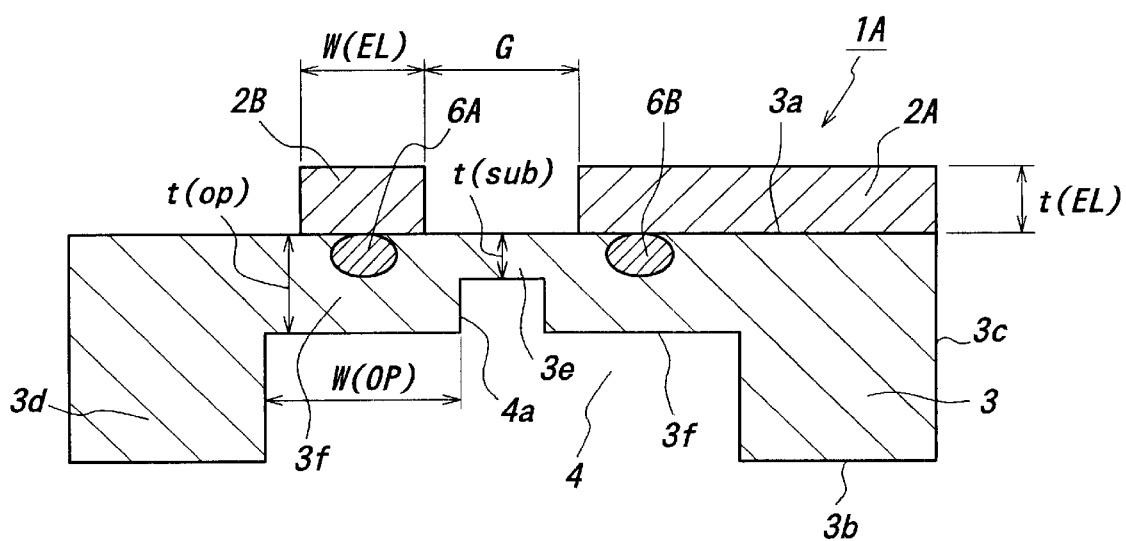
FIG. 2 is a cross sectional view schematically showing another travelling wave-type optical modulator 1A according to the present invention.

In FIG. 1, a coplaner waveguide-type electrode (CPW electrode) structure is employed, but as shown in FIG. 2, an asymmetric coplaner strip line-type electrode (A-CPS electrode) structure may be employed.

In FIG. 2, all of the portions of an optical modulator 1A are almost similar to the ones shown in FIG. 1, but the optical waveguides 6A and 6B are provided under the electrode 2B and 2A, respectively, and two first thinned portions 3f and one second thinned portions 3e sandwiched with the two first thinned portions 3f are provided, which is different from the configuration shown in FIG. 1. In this case, two thickened portions 3d are formed continuously to their respective first thinned portions 3f, and the optical waveguides 6A and 6B are fabricated in the first thinned portions 3f, respectively.

EXAMPLES

Example 1

In this example, a travelling wave-type optical modulator as schematically shown in FIG. 1 was fabricated. Concretely, the substrate 3 was made of a X-cut $LiNbO_3$ single crystal wafer having the size of 3 inches. Then, the Mach Zehnder optical waveguides 6A and 6B were fabricated in the surface side of the substrate 3 by Ti thermal diffusion process and photolithography. The size of each optical waveguide was 10 μm at the standard of $1/e^2$. Then, the CPW electrode structure 2A–2C were fabricated by plating.

The substrate 3 was coated with a resist film, and thereafter, set onto the level block of a micro grind processing machine with thermoplastic resin stick wax (made by Nikka Seiko Co.). In this case, the substrate 3 is aligned on its orientation flat plane. As a grinding stone, a resin-bonded diamond grinding stone with a roughness of No. #6000 was used. Then, the substrate 3 was ground from the bottom surface 3b with the diamond grinding stone at the rotation number of 30000 rpm and the feeding speed of 0.3 mm/sec, to form the recessed portion 4. First of all, within the recessed portion 4 to be fabricated, the substrate 3 was entirely ground up to a predetermined thickness, and then, partially ground to form the strip ditches 4a. The opening width of the recessed portion 4 was set to 100 μm, and the depth was set to 10 μm at the second thinned portion 3e. As a result, the width of the thickened portion 3d was set 30 μm. The sizes of other portions will be described hereinafter.

Moreover, another $LiNbO_3$ single crystal wafer was adhered to the bottom surface 3b of the substrate 3 with epoxy resin to reinforce the substrate 3 with the epoxy resin being not charged into the recessed portion 4. Then, the substrate 3 was taken out of the level block, and the stick wax was removed with an organic solvent. Subsequently, the substrate 3 was cut into chips with a dicing saw processing machine, and the end surfaces of each chip to which the optical waveguides were exposed were optically polished, to complete travelling wave-type optical modulators from the chips.

Then, a single core fiber array having a 1.5 μm-single mode optical fiber was fabricated, and coupled to one of the travelling wave-type optical modulators with ultraviolet curing resin after the centering of the optical fiber for the optical waveguide.

The transmittance performance S21 and the reflective performance S22 of the optical modulator were measured by a network analyzer, and then, the refractive index (nm) of a microwave signal, the characteristic impedance $Z_0$ and the electrode loss α were obtained. Moreover, the half-wavelength voltage Vπ was measured as an electro-optic property. At the measurement, a laser beam having a wavelength of 1.55 μm was introduced from a semiconductor laser, and a saw-shaped microwave having a frequency of 1 kHz was applied to the electrodes. Moreover, the optical insertion loss of the optical modulator after centering was measured.

In this case, the thickness t(OP) of the first thinned portion 3f was set to 20 μm, and the thickness t(sub) of the second thinned portion 3e was set to 12.5 μm. The width W(EL) of the electrode 2B was set to 10 μm, and the distance M between the center of each optical waveguide and the electrode 2B was set 10 μm. Moreover, the electrode gap G was set to 42 μm, and the thickness t(EL) of the electrode was set to 35 μm. Then, the width W(OP) of the first thinned portion 3f (the width of the protrusion 5) was varied as listed in Table 1.

TABLE 1

| W (OP) (μm) | Refractive index of microwave signal nm | Zp (Ω) | α dB/cm | Vπ · L V · cm | Performance coefficient p | Optical insertion loss dB |
|---|---|---|---|---|---|---|
| 0 | 2.149 | 50.4 | 0.1705 | 13.2 | 2.225 | 10 |
| 10 | 2.164 | 49.77 | 0.1708 | 12.46 | 2.127 | 9 |
| 20 | 2.17 | 49.68 | 0.1733 | 12.66 | 2.194 | 8 |
| 30 | 2.188 | 49.29 | 0.1746 | 13.13 | 2.294 | 7 |
| 40 | 2.214 | 48.37 | 0.1765 | 14.04 | 2.478 | 5.5 |
| 50 | 2.244 | 48.08 | 0.1786 | 14.69 | 2.625 | 5 |
| 60 | 2.277 | 47.38 | 0.181 | 14.78 | 2.675 | 4.5 |
| 70 | 2.312 | 46.66 | 0.1836 | 14.51 | 2.662 | 4.5 |
| 80 | 2.349 | 45.94 | 0.186 | 14.09 | 2.621 | 4.5 |
| 90 | 2.384 | 45.25 | 0.1884 | 13.65 | 2.572 | 4.5 |

As is apparent from Table 1, the refractive index (nm) of the microwave signal can be controlled under 2.3 at the thickness t(OP)=20 μm and the width W(OP)=60 μm or over. Moreover, it was confirmed that the change of the characteristic impedance can be reduced up to 50Ω±5Ω at the thickness t(OP)=15–30 μm and the width W(OP)=30–60 μm. Then, when the distance M was set to 10 μm, the product (Vπ·L) of the operating voltage Vπ by the electrode length L was able to be reduced up to the increase of about 1V·cm with keeping the velocity matching, which is much lower than a conventional optical modulator.

Example 2

A travelling wave-type optical modulator as shown in FIG. 1 was fabricated in the same manner as Example 1, and the above-mentioned properties were investigated. However, the thickness t(OP) was set to 20 μm, and the width W(EL) was set to 10 μm. The distance M was set to 10 μm, and the gap G was set to 42 μm, and the thickness t(EL) was set to 35 μm. Then, the thickness t(sub) was varied within 6–12.5 μm. The measured results are listed in Table 2.

TABLE 2

| W (OP) (μm) | Refractive index of microwave signal nm | Zp (Ω) | α dB/cm | Vπ · L V · cm | Performance coefficient p | Optical insertion loss dB |
|---|---|---|---|---|---|---|
| 6 | 1.928 | 55.97 | 0.1529 | 19.52 | 2.985 | 5 |
| 8 | 2.047 | 52.71 | 0.1625 | 17.22 | 2.799 | 5 |
| 10 | 2.145 | 50.31 | 0.1704 | 15.81 | 2.695 | 5 |
| 12.5 | 2.224 | 48.08 | 0.1786 | 14.69 | 2.625 | 5 |

As is apparent from Table 2, the travelling wave-type optical modulator can have a lower microwave signal refractive index (nm) and a higher characteristic impedance $Z_0$. Moreover, by controlling the thickness t(sub) and the width W(OP), the travelling wave-type optical modulator can have a remarkable low optical insertion loss.

Example 3

Figure 3:
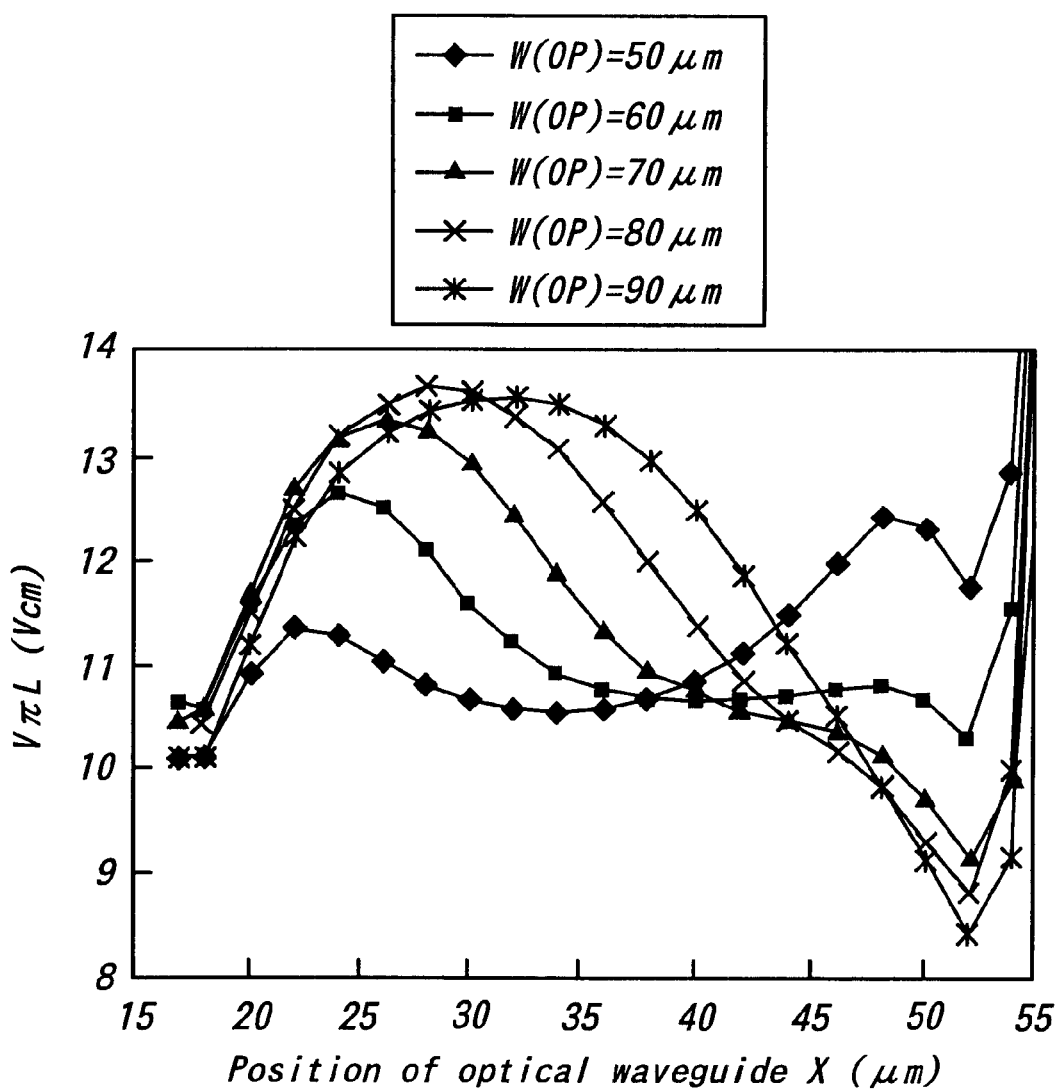
FIG. 3 is a graph showing the simulated data of the product (Vπ·L) of the operating voltage Vπ by the electrode length L in the travelling wave-type optical modulator 1 shown in FIG. 1.

Quasi-TEM analysis was carried out for a travelling wave-type optical modulator as shown in FIG. 1, and the correlation between the product (Vπ·L) of the operating voltage Vπ by the electrode length L and the position X of the optical waveguide 6B from the center electrode 2B was examined. FIG. 3 is a graph showing simulated data from the above quasi-TEM analysis. The simulated data were calculated on plural widths W(OP) as a parameter.

Moreover, the width (EL) was set to 30 μm, and the gap G was set to 40 μm. The thickness t(OP) was set to 15 μm, and the thickness t(sub) was set to 10 μm, and the thickness t(EL) was set to 30 μm. Moreover, it is presumed that the optical waveguide 6B has a spot radius (electric field of 1/e) of 3 μm in a lateral direction and of 2 μm in a vertical direction.

As is apparent from FIG. 3, the products (Vπ·L) are maximized at a position X of 22–32 μm, and are decreased as the positions X are decreased (the optical waveguide 6B sets near the center electrode 2B). That is, in the travelling wave-type optical modulator as shown in FIG. 1, the product (Vπ·L) can be reduced by setting the optical waveguide 6B near the center electrode 2B. Moreover, since the optical waveguide 6B is fabricated in the first thinned portion 3f, the optical insertion loss of the optical modulator can be also reduced.

On the other hand, in FIG. 3, the products (Vπ·L) are decreased as the positions X are increased (the optical waveguide 6B sets apart from the center electrode 2B). In this case, however, the optical waveguide 6B is positioned in the second thinned portion 3e. As a result, the optical waveguide 6B is flatted, and thus, the optical insertion loss is increased.

An optical waveguide having a spot diameter of 5–15 μm (a spot radius of 2.5–7.5 μm) can be easily fabricated by a Ti-thermal diffusion method. Therefore, if the configuration of a travelling wave-type optical modulator is designed on the above simulated data, the product (Vπ·L) and the optical insertion loss of the thus obtained travelling wave-type optical modulator can be reduced sufficiently. Moreover, an optical waveguide having a mode field diameter of about 1 μm can be fabricated by epitaxial growth technique and proton-exchange technique. Therefore, the optical waveguide can be disposed at a position of about 0.5 μm from the center electrode 2B in the first thinned portion 3f and thus, it is estimated that the product (Vπ·L) can be more reduced.

Example 4

Figure 4:
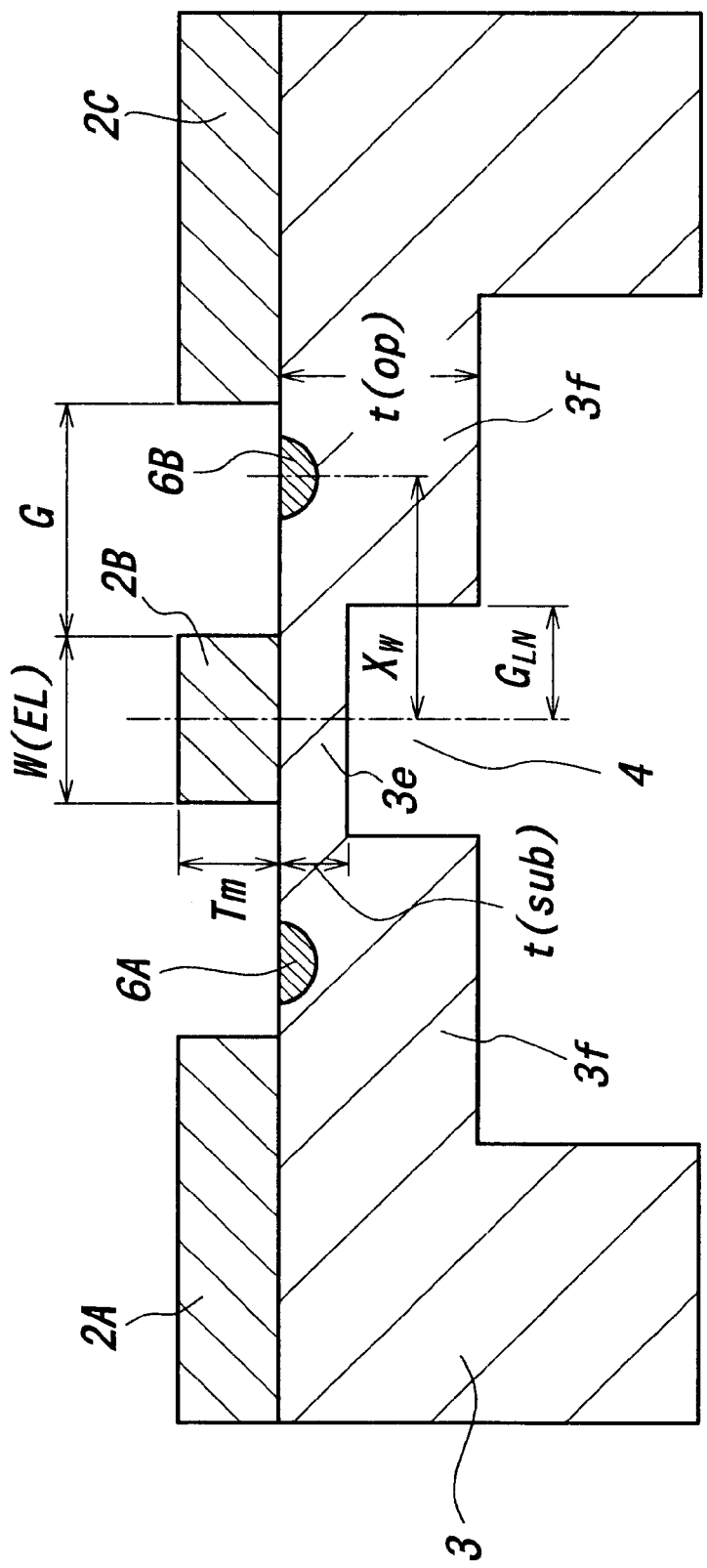
FIG. 4 is a cross sectional view schematically showing a modified one from travelling wave-type optical modulator 1 shown in FIG. 1.

In this example, quasi-TEM analysis was carried out for a travelling wave-type optical modulator as shown in FIG. 4, which is modified for the one shown in FIG. 1, and various properties were examined in detail. In the travelling wave-type optical modulator depicted in FIG. 4, the substrate 3 has the second thinned portion 3e at the center and the first thinned portions 3f at both sides of the center. And, the optical waveguides 6A and 6B are fabricated in the first thinned portion 3f as the travelling wave-type optical modulator.

Figure 5:
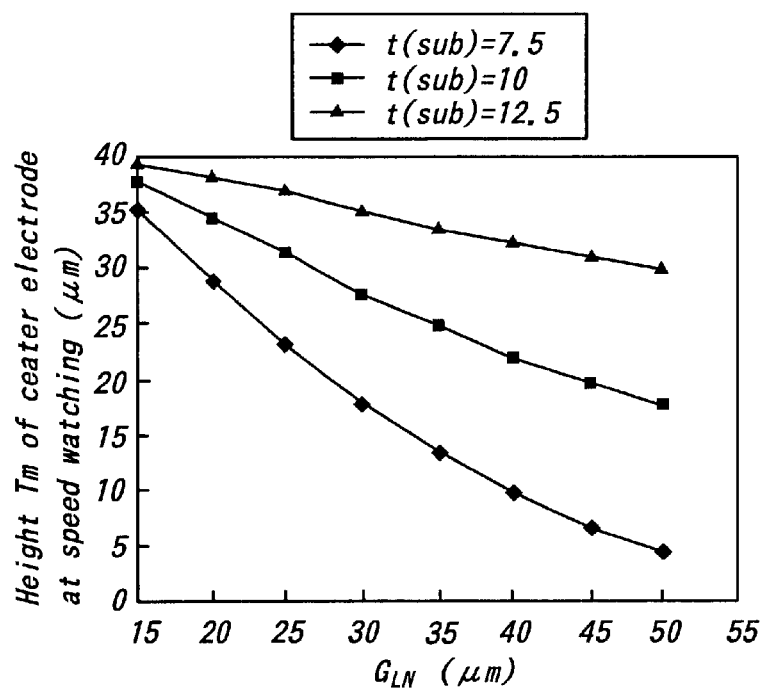
FIG. 5 is a graph showing the simulated data of the height Tm of the center electrode 2B at the velocity matching in the travelling wave-type optical modulator shown in FIG. 4.
Figure 6:
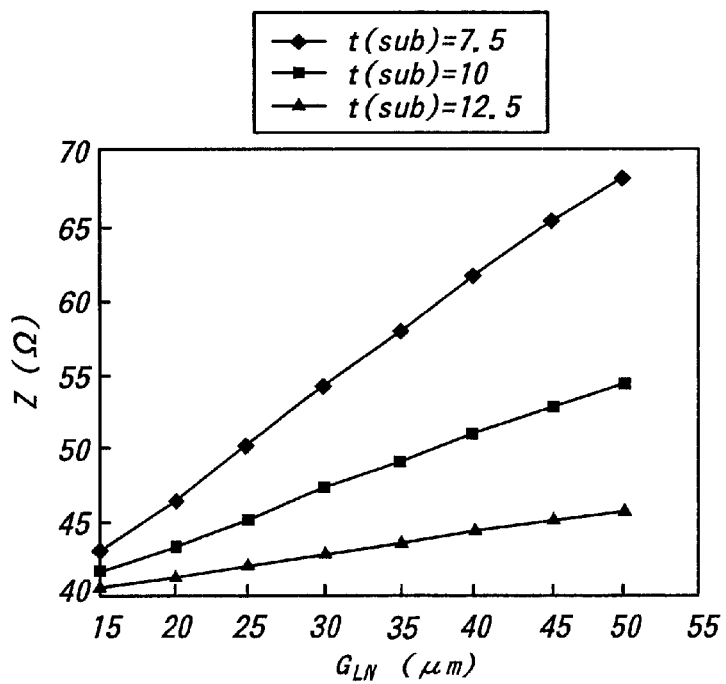
FIG. 6 is a graph showing the simulated data of the characteristic impedance of the travelling wave-type optical modulator.
Figure 7:
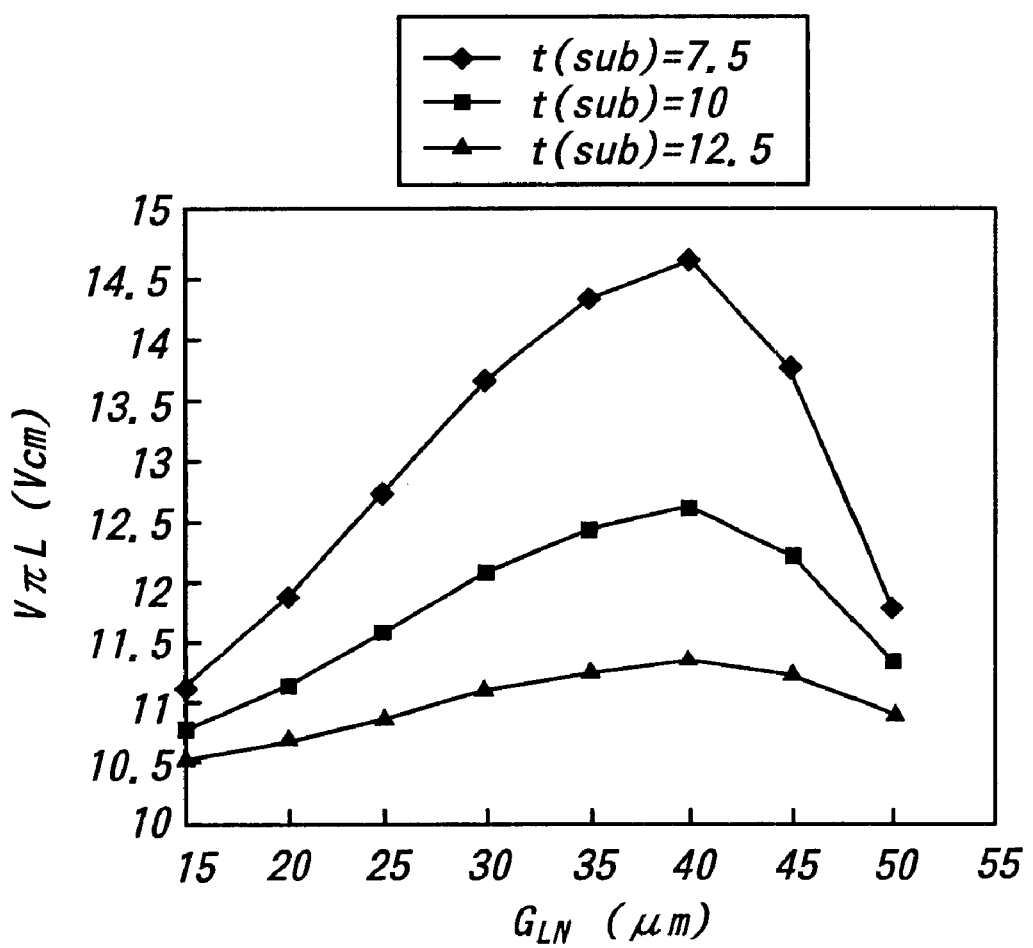
FIG. 7 is a graph showing the simulated data of the product (Vπ·L) of the operating voltage Vπ by the electrode length L of the travelling wave-type optical modulator.

FIG. 5 shows, at the velocity matching, the relation between the height Tm (μm) of the center electrode 2B and the half opening width GLN (μm) of the recessed portion 4 obtained through the formation of the second thinned portion 3e, and FIG. 6 shows the relation between the characteristic impedance Z(Ω) of the travelling wave-type optical modulator and the half opening width GLN. FIG. 7 shows the relation between the product (Vπ·L) and the half opening width GLN.

Herein, the width W(EL) was set to 30 μm, and the gap G was set to 40 μm. Then, the thickness t(OP) was set to 15 μm, and the distance Xw between the optical waveguide 6B and the center of the travelling wave-type optical modulator was set to 50 μm.

As is apparent from the above simulated results, the travelling wave-type optical modulator shown in FIG. 4 can have a characteristic impedance of about 50Ω and a product (Vπ·L) of 13V·cm or below, and thus, can be operated at a high speed. In this case, an optical waveguide having a mode field diameter of about 1 μm can be also fabricated easily, so that the optical waveguide can be disposed at a position of about 0.5 μm from the electrode 2A or 2C in the first thinned portion 3f and thus, it is estimated that the product (Vπ·L) can be more reduced.

As mentioned above, according to the present invention, in a travelling wave-type optical modulator, the product (Vπ·L) of the operating voltage Vπ by the electrode length L and the optical insertion loss can be reduced with keeping the velocity matching of a microwave signal through an electrode for an optical wave through an optical waveguide.

What is claimed is:

1. A travelling wave-type optical modulator comprising;
   a substrate made of an electro-optic material,
   optical waveguides fabricated on the top surface of the substrate, and
   electrodes for modulating an optical wave through the optical waveguide,
   wherein the substrate is partially thinned from the bottom surface of the substrate to form a first thinned portion and a second thinned portion so that the thickness of the first thinned portion is set to be larger than the thickness of the second thinned portion, and the optical waveguide is positioned in the first thinned portion.

2. A travelling wave-type optical modulator as defined in claim 1, wherein the thickness t(OP) of the first thinned portion is set to 1–100 μm, and the thickness t(sub) of the second thinned portion is set to be less than the thickness t(OP).

3. A travelling wave-type optical modulator as defined in claim 2, wherein the thickness t(OP) is set to be larger than the thickness t(sub) by 1 μm or over.

4. A travelling wave-type optical modulator as defined in claim 1, wherein the width W(OP) of the first thinned portion is set within [W(EL)+2 μm]–[W(EL)+2G] (W(EL): width of a center electrode for modulating the optical wave through the optical waveguide, G: gap between the adjacent electrodes).

5. A travelling wave-type optical modulator as defined in claim 4, wherein the gap between the optical center of the optical waveguide and the center electrode is set to be 0.5 μm or over.

6. A travelling wave-type optical modulator as defined in claim 1, wherein a recessed portion is fabricated in the substrate through the formation of the first thinned portion and the second thinned portion, and a protrusion is fabricated in the recessed portion corresponding to the discrepancy between the thickness t(OP) and the thickness t(sub).

* * * * *